(12) United States Patent
Prashar et al.

(10) Patent No.: US 9,388,317 B2
(45) Date of Patent: Jul. 12, 2016

(54) INK FORMULATIONS FOR IMPROVING PRINTHEAD LIFETIME

(71) Applicant: Memjet Technology Ltd., Dublin (IE)

(72) Inventors: Jognandan Prashar, North Ryde (AU); Michele Shepard, San Diego, CA (US); Doreen Bali, North Ryde (AU)

(73) Assignee: Memjet Technology Limited (IE)

( * ) Notice: Subject to any disclaimer, the term of this patent is extended or adjusted under 35 U.S.C. 154(b) by 0 days.

(21) Appl. No.: 14/640,244

(22) Filed: Mar. 6, 2015

(65) Prior Publication Data

US 2015/0274996 A1  Oct. 1, 2015

Related U.S. Application Data

(60) Provisional application No. 61/971,985, filed on Mar. 28, 2014.

(51) Int. Cl.
| | |
|---|---|
| *B41J 29/38* | (2006.01) |
| *B41J 2/17* | (2006.01) |
| *C09D 11/033* | (2014.01) |
| *C09D 11/328* | (2014.01) |
| *C09D 11/30* | (2014.01) |

(52) U.S. Cl.
CPC ............ *C09D 11/033* (2013.01); *B41J 2/1707* (2013.01); *C09D 11/30* (2013.01); *C09D 11/328* (2013.01)

(58) Field of Classification Search
CPC ................................ B41J 2/2107; B41J 2/211
USPC .................................................. 347/6–7, 9, 95
See application file for complete search history.

(56) References Cited

U.S. PATENT DOCUMENTS

| | | | | |
|---|---|---|---|---|
| 2007/0064055 | A1* | 3/2007 | Silverbrook | ......... B41J 2/04505 347/59 |
| 2012/0090503 | A1* | 4/2012 | Baettig | ................. C09B 31/025 106/31.52 |
| 2012/0314004 | A1* | 12/2012 | Silverbrook | ........... B41J 2/1412 347/62 |

* cited by examiner

*Primary Examiner* — Jason Uhlenhake
(74) *Attorney, Agent, or Firm* — Cooley LLP

(57) ABSTRACT

An inkjet ink includes: (i) a disazo dye of formula (I):

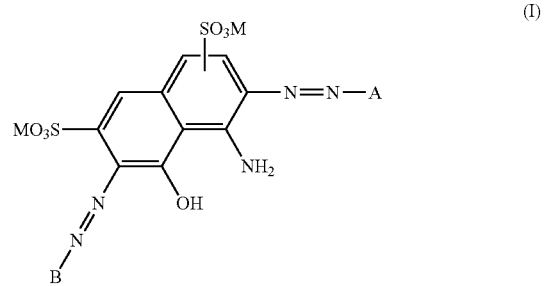

(ii) sulfolane; (iii) a glycol compound selected from the group consisting of: ethylene glycol, diethylene glycol, triethylene glycol, tetraethylene glycol and pentaethylene glycol; and (iv) water.

15 Claims, 3 Drawing Sheets

INK FORMULATIONS FOR IMPROVING PRINTHEAD LIFETIME

FIELD OF THE INVENTION

This invention relates to an inkjet ink. It has been developed primarily for improving the lifetime of printheads, and particularly the Applicant's Memjet® printheads.

BACKGROUND OF THE INVENTION

The present Applicant has developed a plethora of high-speed inkjet printers employing stationary Memjet® printheads which extend across a media width. By contrast, virtually all other types of inkjet printer utilize a scanning printhead which traverses across the media width.

High-speed pagewidth printing necessarily places additional demands on the design of the printhead compared to traditional types of inkjet printhead. The nozzle devices must have a self-cooling design, high ink refill rates and high thermal efficiency. To this end, the Applicant has developed a range of thermal bubble-forming printheads, including those with suspended resistive heater elements (as described in, for example, U.S. Pat. No. 6,755,509; U.S. Pat. No. 7,246,886; U.S. Pat. No. 7,401,910; and U.S. Pat. No. 7,658,977, the contents of which are incorporated herein by reference) and those with embedded ("bonded") resistive heater elements (as described in, for example, U.S. Pat. No. 7,377,623; U.S. Pat. No. 7,431,431; US 2006/250453; and U.S. Pat. No. 7,491,911, the contents of which are incorporated herein by reference).

Nozzle devices having suspended heater elements offer the advantages of efficient heat transfer from the heater element to the ink and self-cooling characteristics. However, they suffer from the disadvantage of relatively short printhead lifetimes, because suspended heater elements are typically less robust than their bonded counterparts.

One approach to improving printhead lifetime is to coat the heater elements with a layer of protective coating. For example, U.S. Pat. No. 6,719,406 (assigned to the present Applicant) describes suspended heater elements having a conformal protective coating, which improves the robustness of the heater element and improves printhead lifetime. However, protective coatings are undesirable for a number of reasons—they reduce the efficiency of heat transfer from the resistive heater elements to the surrounding ink; they consequently affect the self-cooling characteristics; and they introduce additional MEMS fabrication challenges.

Therefore, it is generally preferable to employ uncoated ("naked") heater elements in Memjet® printheads with a consequential reduction in printhead lifetime. To some extent, the choice of heater material can mitigate the effects of using uncoated heater elements. For example, U.S. Pat. No. 7,431,431 describes the use of a self-passivating titanium aluminium nitride heater element, which has improved lifetime compared to more conventional materials, such as titanium nitride. Nevertheless, there is still a need to improve the lifetimes of Memjet® printheads, and particularly those employing uncoated heater elements.

It has been found that certain inks are particularly aggressive towards heater elements. For example, many dye-based inks have been found to corrode heater elements resulting in shortened printhead lifetimes. In a multi-color printhead (e.g. CMYK), the printhead lifetime is, to a large extent, limited by the lifetime of the color channel having the shortest lifetime. If, for example, a black dye-based ink is found to be particularly corrosive towards heater elements, then the lifetime of the printhead will be determined by the lifetime of the black channel, even if all other color channels still perform well when the black color channel fails.

In the present context, "failure" of a nozzle device means any change in drop ejection characteristics which results in unacceptable print quality. For example, failure may be invoked by a reduction in drop velocity, poor drop directionality or non-ejection of ink. Moreover, the criteria for failure may be different for different colors. For example, a reduction in print quality in a yellow channel may be more tolerable than a corresponding reduction in print quality in a black channel, because black ink is more visible to the human eye (i.e. black ink has a higher luminance on white paper). This, in combination with the aggressive nature of many black dyes, means that the black channel in a Memjet® printhead is typically the limiting color channel in terms of printhead lifetime.

It would be desirable to improve the lifetime of printheads employing resistive heater elements. It would be further desirable to improve the lifetime of such printheads without modifying the design of the printhead.

By way of background, US2007/0050926 and US2012/0090503 describes inkjet inks comprising disazo dyes having a central arylene motif of the formula:

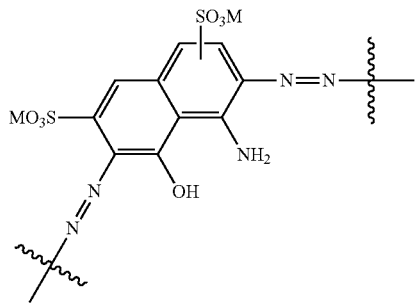

These disazo dyes described in the prior art are formulated in ink vehicles comprising ethylene glycol and diethylene glycol co-solvents.

U.S. Provisional Application No. 61/844,276 filed on 9 Jul. 2013, the contents of which are incorporated herein by reference, describes the use of ethoxylated butyne-1,2-diols as an anti-corrosion additive for improving printhead lifetime.

SUMMARY OF THE INVENTION

In a first aspect, the present invention provides an inkjet ink comprising:
(i) a disazo dye of formula (I):

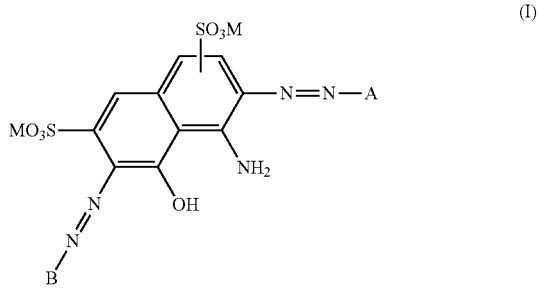

wherein:
A is a $C_{6-14}$ aryl group having 0, 1, 2, 3, 4 or 5 substituents selected from the group consisting of: —$SO_3M$, nitro, carboxyl, halogen, hydroxyl, amino, $C_{1-4}$ alkylamino, $C_{1-4}$ alkoxy, $C_{1-4}$ alkyl, $C_{1-4}$ haloalkyl, cyano, sulfonamide, carbamoyl, $C_{1-4}$ alkylamido and $C_{1-4}$ alkoxycarbonyl;
B is a $C_{6-14}$ aryl group having 0, 1, 2, 3, 4 or 5 substituents selected from the group consisting of: —$SO_3M$, nitro, carboxyl, halogen, hydroxyl, amino, $C_{1-4}$ alkylamino, $C_{1-4}$ alkoxy, $C_{1-4}$ alkyl, $C_{1-4}$ haloalkyl, cyano, sulfonamide, carbamoyl, $C_{1-4}$ alkylamido and $C_{1-4}$ alkoxycarbonyl;
each M is independently selected from the group consisting of: hydrogen, lithium, sodium, potassium, ammonium and quaternary ammonium; and
the dye of formula (I) comprises at least 3 groups of formula —$SO_3M$;
(ii) sulfolane;
(iii) a glycol compound selected from the group consisting of: ethylene glycol, diethylene glycol, triethylene glycol, tetraethylene glycol and pentaethylene glycol; and
(iv) water.

Preferred embodiments of the disazo dye colorant are described in more detail below.

The disazo dye may be present in an amount ranging from 0.01 to 25 wt. %. Preferably, the disazo dye is present in an amount ranging from 1 to 10 wt. %, or preferably 2 to 8 wt. %.

Preferably, the disazo dye is a black dye.

Sulfolane (2,3,4,5-tetrahydrothiophene-1,1-dioxide) is a co-solvent which may be present in an amount ranging from 5 to 40 wt. %, or preferably from 10 to 30 wt. %.

The glycol compound is a co-solvent which may be present in an amount ranging from 1 to 20 wt. %, preferably 1 to 10 wt. %, or preferably 2 to 6 wt. %.

Preferably, the ink comprises a higher order glycol, such as triethylene glycol or tetraethylene glycol, more preferably triethylene glycol. The Applicant's experiments have shown that higher order glycols, in combination with sulfolane, are consistently efficacious in improving printhead lifetime and generally outperform inks comprising only lower order glycols. Moreover, higher order glycols impart other useful properties to the ink, such as humectancy and anti-curl properties. The anti-curl properties of higher order glycols are described in, for example, U.S. Pat. No. 5,356,464. Mixtures of glycol compounds are, of course, contemplated within the scope of the present invention.

Preferably, an amount of sulfolane exceeds an amount of the glycol compound. Preferably, a ratio of sulfolane to the glycol compound is in the range of 10:1 to 2:1, or preferably 8:1 to 4:1.

Preferably, the ink vehicle comprises 0.1 to 30 wt. % of one or more other co-solvents—that is, co-solvents other than the sulfolane and glycol co-solvents described above. The range of other co-solvents is not particularly limited, and some suitable other co-solvents for use in the present invention are described in more detail below.

Preferably, the ink vehicle comprises 0.05 to 2 wt % of at least one surfactant. Preferably, the ink vehicle comprises 0.1 to 1 wt % of surfactant. The range of surfactants is not particularly limited and some suitable surfactants for use in the present invention are described in more detail below. For example, the surfactant may be an anionic, cationic, nonionic or zwitterionic surfactant. Nonionic surfactants having an acetylenic moiety (e.g. the Surfynol® range of surfactants, available from Air Products and Chemicals, Inc.) are generally preferred.

The ink may further comprise a corrosion inhibitor. Corrosion inhibitors may be employed to further improve printhead lifetimes. Preferably, the corrosion inhibitor comprises an acetylenic compound, such as those described in U.S. Provisional Application No. 61/844,276 filed on 9 Jul. 2013. Preferably, the corrosion inhibitor comprises an alkoxylated acetylenic diol.

As described in U.S. Provisional Application No. 61/844, 276, suitable alkoxylated acetylenic diols include compounds of formula (A):

$$R^1-C\equiv C-(CH_2)_m CH(R^2)-(OCH_2R^3)n-OH \quad (A)$$

wherein:
$R^1$ is selected from the group consisting of: H, $C_{1-3}$ alkyl; and —$(CH_2)_p CH(R^4)(R^5)$;
$R^2$ is selected from the group consisting of: H and $C_{1-3}$ alkyl;
$R^3$ is selected from the group consisting of: —$CH_2$— and —$CH(CH_3)$—;
$R^4$ is selected from the group consisting of: H and $C_{1-3}$ alkyl;
$R^5$ is selected from the group consisting of: —OH and —$(OCH_2R^3)_q$—OH;
m is 0, 1, 2 or 3;
n is 1 to 50;
p is 0, 1, 2 or 3; and
q is 1 to 50.

The alkoxylated acetylenic diol may be an ethoxylated butynediol, such as a compound of formula (B):

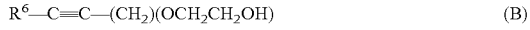

$$R^6-C\equiv C-(CH_2)(OCH_2CH_2OH) \quad (B)$$

wherein:
$R^6$ is selected from the group consisting of: —$CH_2OH$ and —$CH_2(OCH_2CH_2OH)$.

Typically, the corrosion inhibitor, when present, comprises 1,4-bis(2-hydroxyethoxy)-2-butyne).

In a second aspect, there is provided a method of improving a lifetime of an inkjet printhead, the method comprising the steps of:
supplying an ink as described above to nozzle chambers of the printhead, each nozzle chamber having an associated actuator in contact with the ink; and
actuating one or more of the actuators to eject ink from the printhead.

The method according to second aspect significantly improves printhead lifetimes compared to methods employing inks comprising disazo dyes and co-solvents not in accordance with the ink described above.

Preferably, each actuator comprises a resistive heater element, which superheats ink so as to form a bubble and eject ink from the corresponding nozzle chamber via a nozzle opening.

Preferably, the heater element is uncoated so that the ink is in direct contact with the heater element material. The heater element may be suspended in the nozzle chamber or bonded to a wall (e.g. floor) of the nozzle chamber.

Preferably, the heater element is comprised of a metal or a conductive ceramic material, such as a metal nitride. As used herein, the term "metal" includes metal alloys containing a plurality of different metals. Preferably, the heater element is comprised of a material selected from the group consisting of: a titanium alloy (e.g. titanium-aluminium alloy); titanium nitride; and a nitride of a titanium alloy (e.g. titanium aluminium nitride).

In a third aspect, there is provided an inkjet printer comprising:
an inkjet printhead having a plurality of nozzle chambers, each nozzle chamber having an associated actuator for contacting ink; and an ink reservoir in fluid communication with the nozzle chambers, the ink reservoir containing an ink as described above.

In a fourth aspect, there is provided a use of an ink as described herein, or use of a disazo dye of formula (I), for improving a lifetime of an inkjet printhead.

In a fifth aspect, there is provided a method of improving a lifetime of an inkjet printhead, the method comprising the steps of:

supplying an ink to nozzle chambers of the printhead, each nozzle chamber having an uncoated heater element in contact with the ink; and actuating one or more of the heater elements to eject ink from the printhead, wherein the ink comprises:
(i) a black disazo dye;
(ii) sulfolane;
(iii) a higher order glycol compound selected from the group consisting of: triethylene glycol, tetraethylene glycol and pentaethylene glycol; and
(iv) water.

In accordance with the fifth aspect, the black disazo dye is not particularly limited and may be, for example, a dye according to formula (I) or another disazo dye, such as Food Black 2.

Preferred embodiments of the second, third, fourth and fifth aspects will be readily apparent from the foregoing. Preferred embodiments, where described, are not intended to be limited to any particular aspect of the present invention.

As used herein, the term "aryl" refers to an aromatic group, such as phenyl, naphthyl or anthracenyl. Unless otherwise specified, the term "aryl" generally refers to $C_{6-14}$ aryl groups.

As used herein, the term "alkyl" refers to alkyl groups in both straight and branched forms. Unless otherwise specified, the term "alkyl" generally refers to $C_{1-4}$ alkyl groups.

As used herein, the term "halogen" or "halo" refers to any of fluorine, chlorine, bromine and iodine. Usually, the term "halogen" to chlorine or fluorine substituents.

As used herein, the term "haloalkyl" refers to alkyl groups having one or more halogen substituents e.g. trifluoromethyl.

As used herein, the term "carboxyl" refers to carboxylic acid groups in protonated or salt form. Generally, carboxyl groups are —$CO_2M$ groups, wherein M is as defined hereinabove.

As used herein, the term "alkylamino" refers to both mono-alkylamino and di-alkylamino groups.

As used herein, the term "sulphonamide" refers to aminosulfonyl and alkylaminosulfonyl groups.

As used herein, the term "carbamoyl" refers to aminocarbonyl and alkylaminocarbonyl groups.

As used herein, the term "ammonium" generally refers to $NH_4^+$ cations. The term "quaternary ammonium" generally refers to cations of formula $N(R^a)_4^+$, wherein each $R^a$ is independently selected from the group consisting of $C_{1-6}$ alkyl, aryl and arylalkyl. A typical example of a quaternary ammonium ion is tetramethylammonium.

By convention, sulfonate groups are represented as —$SO_3M$ in formula (I) above. However, it will of course be appreciated that such groups usually exist in solution as ion pairs i.e. —$SO_3^-M^-$. Thus, when reference is made to M being an alkali metal, it is implicit that reference is being made to the corresponding alkali metal ion $M^-$, such as $Li^-$, $Na^+$ or $K^+$.

BRIEF DESCRIPTION OF THE DRAWINGS

Various embodiments of the present invention will now be described by way of example only with reference to the accompanying drawings, in which.

DETAILED DESCRIPTION OF THE INVENTION

Figure 1:
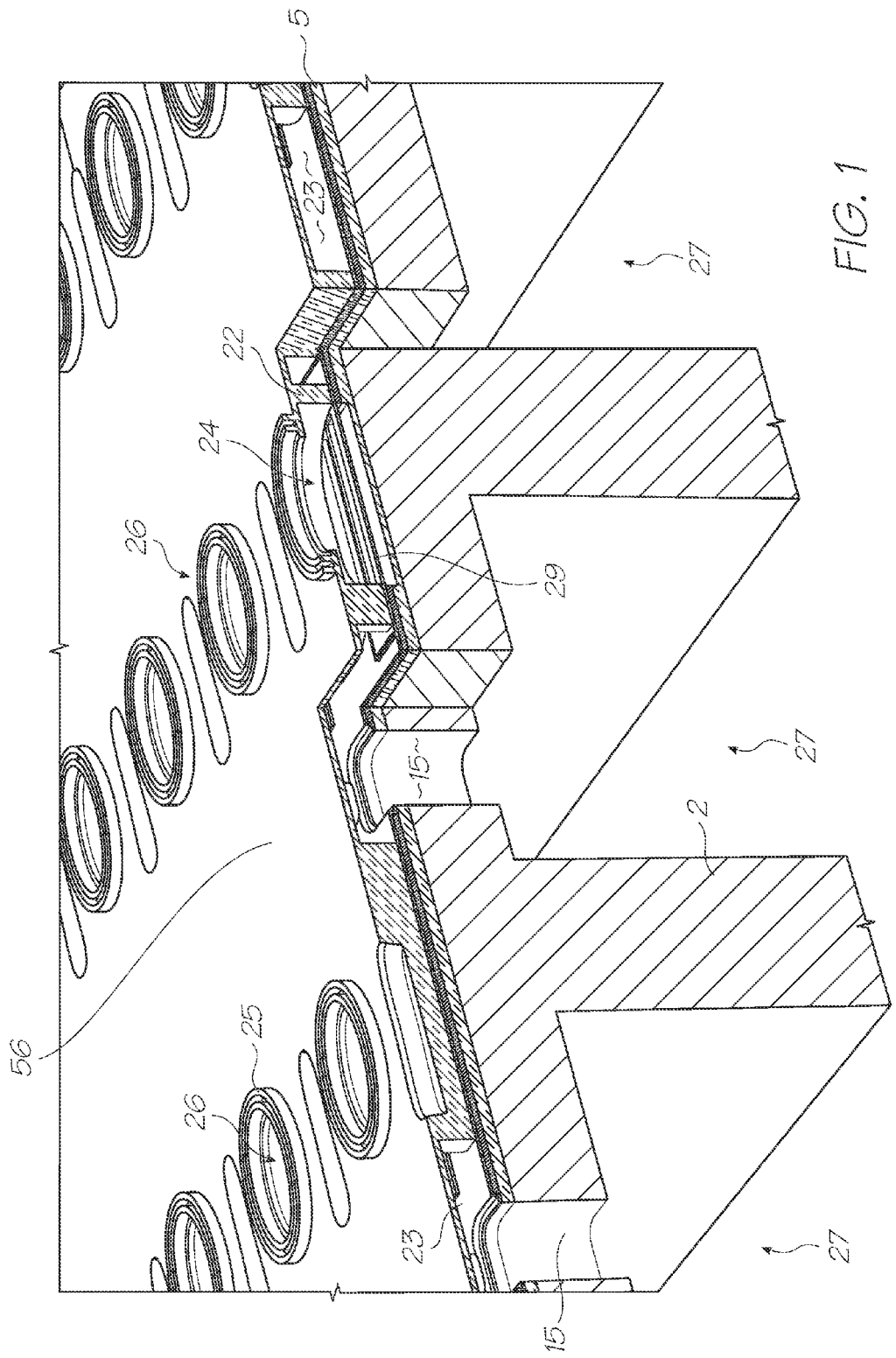
FIG. 1 is a perspective view of part of a thermal inkjet printhead.

The present inventors have sought a solution to the problem of improving printhead lifetime by investigating dye and co-solvent combinations. As foreshadowed above, an ink formulation is an attractive solution to the problem of printhead lifetime, because it does not require any modifications to the design of the printhead. However, hitherto, the corrosiveness of inkjet dyes was understand to be related to the presence of alkali metal ions, such as sodium and potassium, or the presence of reactive functional groups on the dye molecule (e.g. C.I. Reactive Black 5). Therefore, attempts to improve printhead lifetime have usually focused on ink additives for suppressing known corrosion mechanisms.

Sulfonated disazo dyes are an attractive class of dyes for use in Memjet® printheads, because they exhibit excellent rehydration characteristics. A non-functioning printhead nozzle which has become blocked with dehydrated ink will become functioning again during routine maintenance operations if the dye has suitable rehydration characteristics. By contrast, nozzles blocked with inks having poor rehydration characteristics (e g. inks containing trisazo dyes) are more problematic and cannot be readily recovered during routine maintenance operations.

Sulfonated disazo dyes are a well known class of dye and include, for example, Food Black 2:

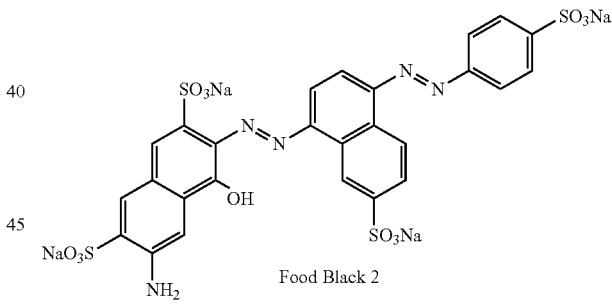

However, whilst Food Black 2 has excellent rehydration characteristics and acceptable black optical density for most applications, conventional inks formulated with Food Black 2 (sodium salt) generally exhibit very poor printhead lifetimes of the order of <20 million ejections in Memjet® printheads. Substituting the sodium salt of Food Black 2 with other counterions, such as tetramethylammonium produces a marked improvement in printhead lifetime. Therefore, it was initially considered that the alkali metal ion content of ink is primarily responsible for heater corrosion in inkjet nozzle devices, consistent with other hypotheses reported in the literature (see, for example, U.S. Pat. No. 6,252,617 which advocates an alkali metal ion content of less than $5 \times 10^{-3}$ mol/l for improved printhead lifetime).

Although experiments by the Applicant showed that printhead lifetimes associated with Food Black 2 could be improved by substituting sodiums ions with tetramethylammonium ions, the relatively poor stability of Food Black 2 towards light led the present inventors to consider similar disazo dyes having reportedly improved lightfastness. For example, US2007/0050926 and US2012/0090503 describe disazo dyes having a different central arylene motif than Food Black 2, and which have excellent lightfastness.

Surprisingly, it was found that inks comprising disazo dyes of formula (I) generally exhibited superior printhead lifetimes compared to inks comprising Food Black 2, even though both dyes were in their sodium salt form, and both dyes are similar highly sulfonated disazo compounds. Therefore, in contrast with reports in the literature (e.g. U.S. Pat. No. 6,252,617), the presence or otherwise of sodium ions may not be the primary modulator of heater corrosion mechanisms and, in fact, the nature of the organic dye structure appears to be a more significant factor, at least when used in the Applicant's Memjet® printheads.

What is more surprising is that the presence of certain co-solvents in the ink vehicle also has a significant effect on printhead lifetimes for those inks containing disazo dyes. In particular, the presence of sulfolane and a glycol compound (e.g. triethylene glycol) in combination provided an apparently synergistic effect in terms of improved printhead lifetime. Inks formulated with sulfolane only or ethylene glycol only did not show the same improvement as the combination. The surprising effectiveness, in terms of improved printhead lifetime, of certain co-solvent combinations with certain disazo dyes was not at all predictable from the prior art.

Thus, the present invention provides inks exhibiting improved printhead lifetimes, as well as excellent lightfastness and rehydration characteristics. Moreover, the inks according to the present invention do not require inconvenient and potentially expensive substitution of alkali metal ions in order to achieve improved printhead lifetimes.

Colorant

As described above, the colorant in the inks according to the present invention is a disazo dye of formula (I).

Preferably, each of A and B has at least one substituent of formula —$SO_3M$, such that the dye of formula (I) comprises at least 4 groups of formula —$SO_3M$.

Preferably, A is a phenyl or naphthyl group having 1, 2 or 3 substituents selected from the group consisting of: —$SO_3M$, nitro, carboxyl, halogen, hydroxyl, amino, $C_{1-4}$ alkoxy and $C_{1-4}$ alkyl.

Preferably, A is a phenyl group having 1, 2 or 3 substituents selected from the group consisting of: —$SO_3M$, nitro and carboxyl, and more preferably the group consisting of: —$SO_3M$ and nitro.

Preferably, A is a phenyl group having 2 substituents selected from the group consisting of: —$SO_3M$ and nitro.

Preferably, B is a phenyl or naphthyl group having 1, 2 or 3 substituents selected from the group consisting of: —$SO_3M$, nitro, carboxyl, halogen, hydroxyl, amino, $C_{1-4}$ alkoxy and $C_{1-4}$ alkyl.

Preferably, B is a phenyl group having 1, 2 or 3 substituents selected from —$SO_3M$, nitro and carboxyl, and more preferably the group consisting of: —$SO_3M$ and nitro.

Preferably, B is a phenyl group having 2 substituents selected from the group consisting of: —$SO_3M$ and nitro.

Preferably, A and B are different than each other.

Preferably, M is sodium.

Preferably, the disazo dye is of formula (II):

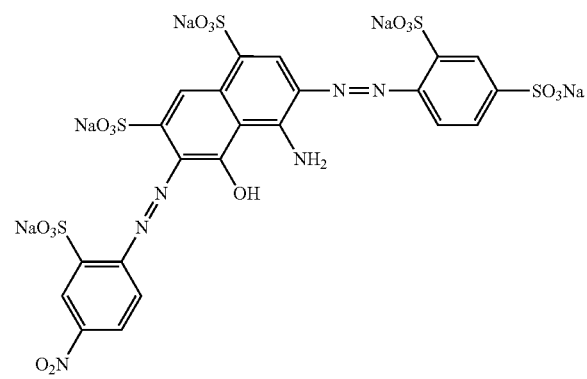

The disazo dyes of formula (I) may be used in inkjet inks either individually or as a combination of two or more thereof. Moreover, the inks according to the present invention may comprise other colorants, such as dyes used for tinting the ink so as to optimize hue and chroma. Suitable tinting dyes will be readily apparent to the person skilled in the art.

Ink Vehicle

The ink vehicles used in the present invention are typically conventional aqueous ink vehicles comprising at least 40 wt % water, at least 50 wt % water or at least 60 wt % water. Usually, the amount of water present in the inkjet ink is in the range of 40 wt % to 90 wt %, or optionally in the range of 50 wt % to 70 wt %.

The inks according to the present invention comprise at least sulfolane and the glycol compound as co-solvents. The inks according to the present invention may further comprise other co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include $C_{1-4}$ alkyl alcohols, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, ε-caprolactam, dimethyl sulfoxide, morpholine, N-ethylmorpholine, 1,3-dimethyl-2-imidazolidinone and combinations thereof.

In addition to the glycol compounds, the inkjet ink may contain another high-boiling water-soluble organic solvent as a co-solvent, which can serve as a wetting agent or humectant for imparting water retentivity and wetting properties to the ink composition. Examples of high-boiling water-soluble organic solvents are 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, trimethylolpropane, erythritol, pentaerythritol and combinations thereof.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet ink may also contain a penetrant, as one of the co-solvents, for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

Typically, the total amount of co-solvent (including sulfolane, glycol compound and other co-solvents) present in the ink is in the range of about 10 wt % to 60 wt %, or optionally 15 wt % to 50 wt %.

The inkjet ink may also contain one or more surface active agents ("surfactant"), such as an anionic surface active agent, a zwitterionic surface active agent, a nonionic surface active agent or mixtures thereof. Useful anionic surface active agents include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are sodium dodecylbenzenesulfonate, sodium laurate, and a polyoxyethylene alkyl ether sulfate ammonium salt.

Examples of zwitterionic surface active agents include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N—(Z-9-octadecenyl)-N-amine oxide.

Examples of nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate.

Acetylene glycol surface active agents, such as 2,4,7,9-tetramethyl-5-decyne-4,7-diol; ethoxylated 2,4,7,9-tetramethyl-5-decyne-4,7-diol; 3,6-dimethyl-4-octyne-3,6-diol or 3,5-dimethyl-1-hexyn-3-ol, may also be used. Specific examples of nonionic surfactants, which may be used in the present invention, are Surfynol® 465 and Surfynol® 440 (available from Air Products and Chemicals, Inc).

The surfactant(s) are typically present in the aqueous inkjet ink in an amount ranging from 0.05 wt. % to 2 wt % or 0.1 to 1 wt. %.

The aqueous inkjet ink may also include a pH adjuster or buffer, such as sodium hydroxide, potassium hydroxide, lithium hydroxide, sodium carbonate, sodium hydrogencarbonate, potassium carbonate, potassium hydrogencarbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl)aminomethane hydrochloride, triethanolamine, diethanolamine, diethylethanolamine, triisopropanolamine, butyldiethanolamine, morpholine, propanolamine, 4-morpholineethanesulfonic acid and 4-morpholinepropanesulfonic acid ("MOPS"). The amount of pH adjuster, when present, is typically in the range of from 0.01 to 2 wt. % or 0.05 to 1 wt. %.

The aqueous inkjet ink may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The amount of biocide, when present, is typically in the range of from 0.01 to 2 wt. % or 0.05 to 1 wt. %.

The aqueous inkjet ink may also contain a sequestering agent, such as ethylenediaminetetraacetic acid (EDTA).

Inkjet Printheads

The inks according to the present invention are primarily for use in connection with thermal inkjet printheads, although they may be used in other types of printhead, especially those where an actuator contacts the ink. For the sake of completeness, there now follows a brief description of one of the Applicant's thermal inkjet printheads, as described in U.S. Pat. No. 7,303,930, the contents of which is herein incorporated by reference.

Figure 2:
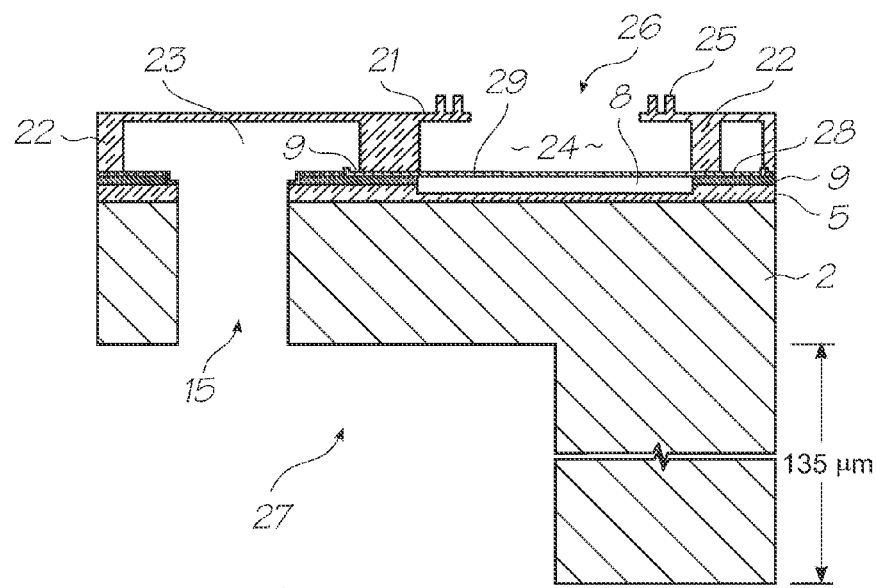
FIG. 2 is a side view of one of the nozzle assemblies shown in FIG. 1.
Figure 3:
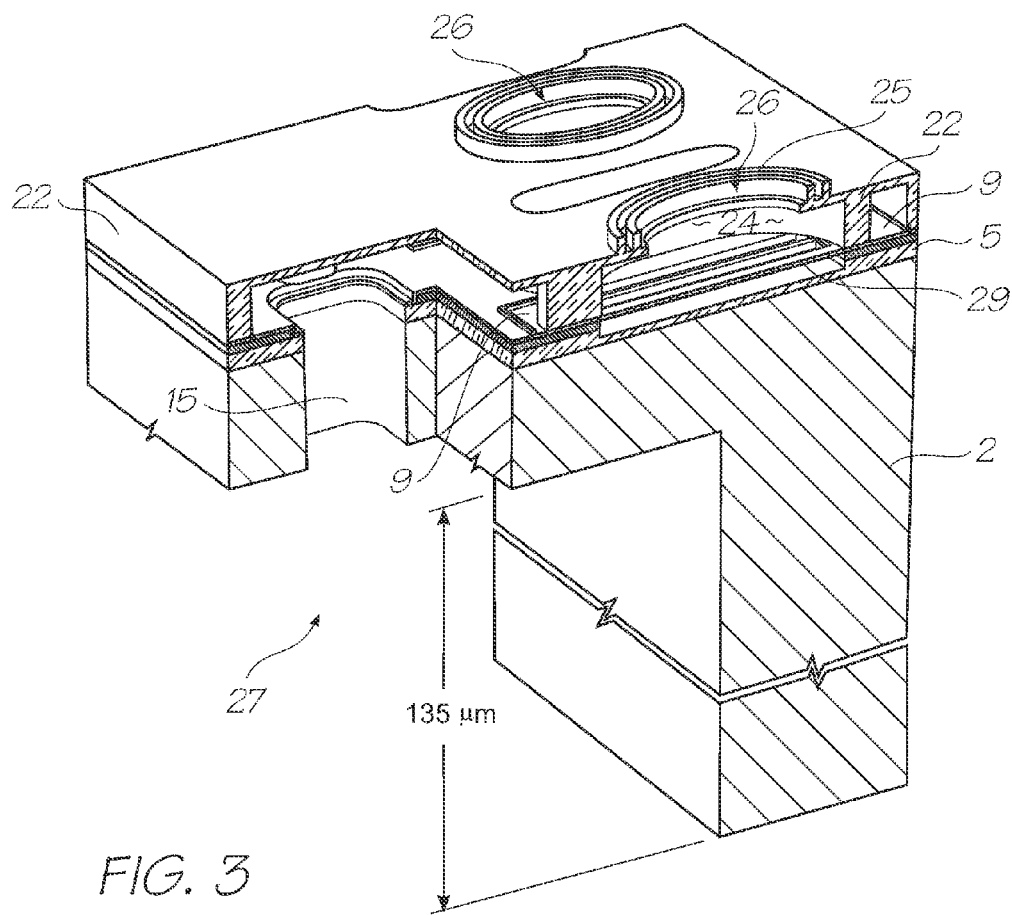
FIG. 3 is a perspective of the nozzle assembly shown in FIG. 2.

Referring to FIG. 1, there is shown part of a printhead comprising a plurality of nozzle assemblies. FIGS. 2 and 3 show one of these nozzle assemblies in side-section and cut-away perspective views.

Each nozzle assembly comprises a nozzle chamber 24 formed by MEMS fabrication techniques on a silicon wafer substrate 2. The nozzle chamber 24 is defined by a roof 21 and sidewalls 22 which extend from the roof 21 to the silicon substrate 2. As shown in FIG. 1, each roof is defined by part of a nozzle plate 56, which spans across an ejection face of the printhead. The nozzle plate 56 and sidewalls 22 are formed of the same material, which is deposited by PECVD over a sacrificial scaffold of photoresist during MEMS fabrication. Typically, the nozzle plate 56 and sidewalls 21 are formed of a ceramic material, such as silicon dioxide or silicon nitride. These hard materials have excellent properties for printhead robustness, and their inherently hydrophilic nature is advantageous for supplying ink to the nozzle chambers 24 by capillary action.

Returning to the details of the nozzle chamber 24, it will be seen that a nozzle opening 26 is defined in a roof of each nozzle chamber 24. Each nozzle opening 26 is generally elliptical and has an associated nozzle rim 25. The nozzle rim 25 assists with drop directionality during printing as well as reducing, at least to some extent, ink flooding from the nozzle opening 26. The actuator for ejecting ink from the nozzle chamber 24 is a heater element 29 positioned beneath the nozzle opening 26 and suspended across a pit 8. Current is supplied to the heater element 29 via electrodes 9 connected to drive circuitry in underlying CMOS layers of the substrate 2. When a current is passed through the heater element 29, it rapidly superheats surrounding ink to form a gas bubble, which forces ink through the nozzle opening 26. By suspending the heater element 29, it is completely immersed in ink when the nozzle chamber 24 is primed. This improves printhead efficiency, because less heat dissipates into the underlying substrate 2 and more input energy is used to generate a bubble. Typically, the heater element is comprised of a metal or a conductive ceramic material. Examples of suitable materials include titanium nitride, titanium aluminium nitride and titanium-aluminium alloy.

As seen most clearly in FIG. 1, the nozzles are arranged in rows and an ink supply channel 27 extending longitudinally along the row supplies ink to each nozzle in the row. The ink supply channel 27 delivers ink to an ink inlet passage 15 for each nozzle, which supplies ink from the side of the nozzle opening 26 via an ink conduit 23 in the nozzle chamber 24.

A MEMS fabrication process for manufacturing such printheads is described in detail in U.S. Pat. No. 7,303,930, the contents of which are herein incorporated by reference.

The operation of printheads having suspended heater elements is described in detail in the Applicant's U.S. Pat. No. 7,278,717, the contents of which are incorporated herein by reference.

The Applicant has also described thermal bubble-forming inkjet printheads having embedded heater elements. Such printheads are described in, for example, U.S. Pat. No. 7,246,876 and US 2006/0250453, the contents of which are herein incorporated by reference.

The inkjet inks of the present invention function optimally in combination with the Applicant's thermal inkjet printheads, as described above. However, their use is not limited to the Applicant's thermal printheads. The inks described herein may be used in other types of thermal bubble-forming inkjet printheads, piezoelectric printheads and thermal-bend actuated printheads (as described in, for example, U.S. Pat. No. 7,926,915; U.S. Pat. No. 7,669,967; and US 2011/0050806, the contents of which are incorporated herein by reference) etc.

For the sake of completeness, inkjet printers incorporating the Applicant's thermal inkjet printheads are described in, for example, U.S. Pat. No. 7,201,468; U.S. Pat. No. 7,360,861; U.S. Pat. No. 7,380,910; and U.S. Pat. No. 7,357,496, the contents of each of which are herein incorporated by reference.

Figure 4:
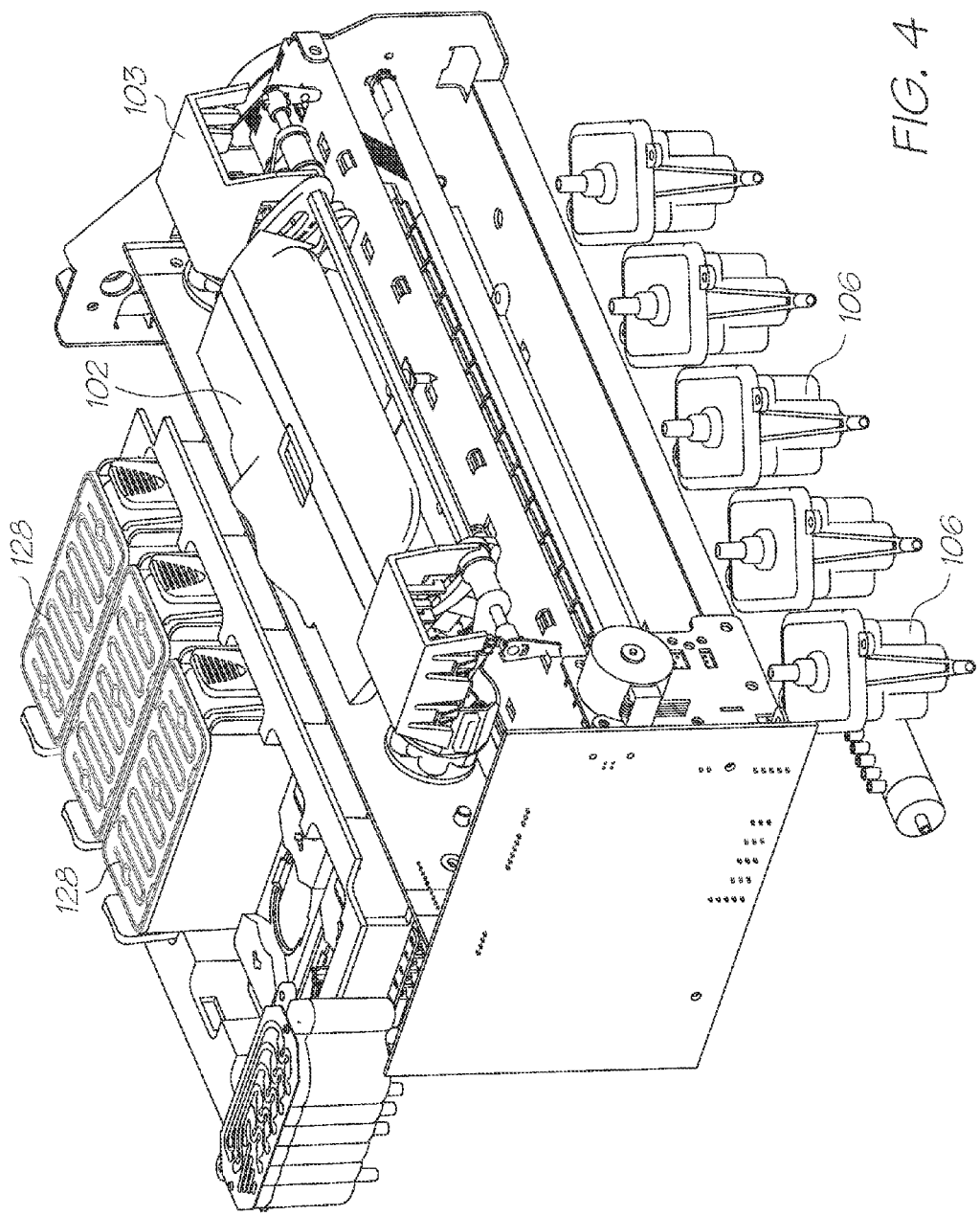
FIG. 4 is perspective view of a thermal inkjet print engine.

FIG. 4 shows a print engine 103 for a thermal inkjet printer, as described in Applicant's U.S. Pat. No. 8,066,359, the contents of which is herein incorporated by reference. The print engine 103 includes a removable print cartridge 102, comprising a pagewidth printhead, and a bank of user-replaceable ink cartridges 128. Each color channel typically has its own ink reservoir 128 and a corresponding pressure-regulating chamber 106 for regulation of a hydrostatic pressure of ink supplied to the printhead. Hence, the print engine 103 has five ink reservoirs 128 and five corresponding pressure-regulating chambers 106. Typically, the ink channels ("color channels") employed in this five-channel print engine 103 are $CMYK_1K_2$. The ink channel order may be arranged so as to optimize preferred ink color mixing effects at the nozzle plate of the printhead, as described in US2013/0070024, the contents of which are herein incorporated by reference. For example, an ink channel order of $YK_1MK_2C$ may be employed where cyan (C) is positioned furthest downstream and yellow (Y) is positioned furthest upstream.

At least one of the ink cartridges 128 may comprise an inkjet ink as described herein. Although fluidic connections between the various components are not shown in FIG. 4, it will be appreciated that these connections are made with suitable hoses in accordance with the fluidics system described in, for example, U.S. Pat. No. 8,066,359, the contents of which are incorporated herein by reference.

Experimental Section

Accelerated printhead lifetime tests were conducted in accordance with the method described below.

Memjet® printhead integrated circuits (PHICs) having nozzle devices with suspended uncoated resistive heater elements were mounted individually for operation in a modified printing rig. The heater element material exposed to the ink is titanium aluminium nitride.

The devices were operated to eject ink at a frequency of 11 kHz. Actuation pulse widths were controlled to replicate operation in an otherwise unmodified printer. The pulse widths are conventionally reporting in "clocks", which indicate the energy above a threshold pulse width required to eject a droplet of ink. Each clock represents 7 ns and the threshold pulse width of the device is typically 47 clocks (329 ns). In the accelerated printhead lifetime tests, the devices were run at two different ejection energies: "+8 clocks" [329 ns+(8×7 ns)=385 ns] and "+10 clocks" [329 ns+(10×7 ns)=399 ns].

Test patterns were printed periodically and visually inspected to determine the health of the devices. Once the print quality had fallen below a predetermined threshold, the PHIC was deemed to have reached the end of its lifetime and the test was stopped. The number of ejections at the time of printhead failure was recorded to indicate printhead lifetime.

Inks were formulated as described in Table 1 and filtered (0.2 microns) prior to use.

TABLE 1

Ink formulations for accelerated printhead lifetime tests

|  | Ink 1 | Ink 2 | Ink 3 | Ink 4 | Ink 5 | Ink 6 |
|---|---|---|---|---|---|---|
| Ethylene glycol | 17 | 17 |  |  |  |  |
| Sulfolane |  |  | 24 | 24 | 21.5 | 21.5 |
| Diethylene glycol |  |  |  |  |  |  |
| Triethylene glycol |  |  | 3.8 | 3.8 |  |  |
| N-methylpyrrolidone | 8.5 | 8.5 |  |  |  |  |
| Propylene-1,2-glycol | 8.5 | 8.5 |  |  |  |  |
| Glycerol |  |  | 6.2 | 6.2 | 3.5 | 3.5 |
| Food Black 2 Na salt |  | 6 |  | 6 |  | 5.5 |
| Formula (II) dye | 6 |  | 6 |  | 5.5 |  |
| MOPS[1] | 0.2 | 0.2 | 0.2 | 0.2 | 0.2 | 0.2 |
| Surfynol ® 465[2] | 0.2 | 0.2 | 0.2 | 0.2 | 0.2 | 0.2 |
| Proxer ® GXL | 0.2 | 0.2 | 0.2 | 0.2 | 0.2 | 0.2 |
| Water | 59.4 | 59.4 | 59.4 | 59.4 | 68.9 | 68.9 |

[1]MOPS is 3-(N-morpholino)propanesulfonic acid
[2]Surfynol ® 465 is ethoxylated 2,4,7,9-tetramethyl-5-decyne-4,7-diol Inks 1-6 were tested in the modified printing rig described above and the number of ejections before printhead failure, as judged by visual inspection of a standardized print quality test pattern, was determined. The results from these accelerated printhead lifetime tests are shown in Table 2.

TABLE 2

Accelerated printhead lifetime test results

| | Millions of ejections before failure | |
|---|---|---|
| Tested Ink | +8 clocks | +10 clocks |
| Ink 1 | 130 | 80 |
| Ink 2 | 20 | 10 |
| Ink 3 | 170 | 130 |
| Ink 4 | 55 | 40 |
| Ink 5 | 130 | 80 |
| Ink 6 | 60 | 30 |

From Table 2, the following observations can be made:

(1) Inks 1, 3 and 5 containing the black dye of formula (II) had significantly longer printhead lifetimes than Inks 2, 4 and 6 containing Food Black 2. These longer printhead lifetimes were consistently observed irrespective of the formulation and despite the fact that all dyes tested had sodium counterions.

(2) Of the inks containing the black dye of formula (II), Ink 3 formulated with sulfolane and triethylene glycol co-solvents was generally superior to Ink 1 and Ink 5.

(3) Of the inks containing Food Black 2, Inks 4 and 6 had comparable printhead lifetimes, while Ink 2 had a very poor printhead lifetime.

(4) Ink 3 containing the black dye of formula (II) in a formulation comprising sulfolane and triethylene glycol co-solvents significantly outperformed all other inks.

From these results, it was concluded that there was synergism between the dye of formula (II), sulfolane and triethylene glycol, which significantly improved the lifetime of Memjet® printheads.

It will, of course, be appreciated that the present invention has been described by way of example only and that modifications of detail may be made within the scope of the invention, which is defined in the accompanying claims.

The invention claimed is:

1. An inkjet ink comprising:
    (i) a disazo dye of formula (I):

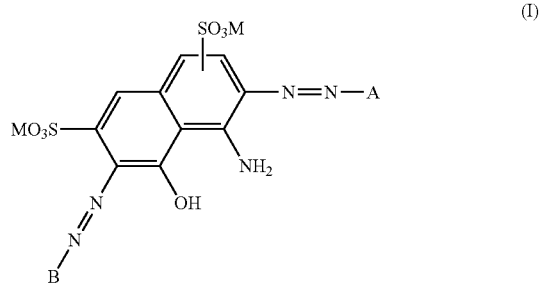

wherein:
   A is a $C_{6-14}$ aryl group having 0, 1, 2, 3, 4 or 5 substituents selected from the group consisting of: —$SO_3M$, nitro, carboxyl, halogen, hydroxyl, amino, $C_{1-4}$ alkylamino, $C_{1-4}$ alkoxy, $C_{1-4}$ alkyl, $C_{1-4}$ haloalkyl, cyano, sulfonamide, carbamoyl, $C_{1-4}$ alkylamido and $C_{1-4}$ alkoxycarbonyl;
   B is a $C_{6-14}$ aryl group having 0, 1, 2, 3, 4 or 5 substituents selected from the group consisting of: —$SO_3M$, nitro, carboxyl, halogen, hydroxyl, amino, $C_{1-4}$ alkylamino, $C_{1-4}$ alkoxy, $C_{1-4}$ alkyl, $C_{1-4}$ haloalkyl, cyano, sulfonamide, carbamoyl, $C_{1-4}$ alkylamido and $C_{1-4}$ alkoxycarbonyl;
   each M is independently selected from the group consisting of: hydrogen, lithium, sodium, potassium, ammonium and quaternary ammonium; and
   the dye of formula (I) comprises at least 3 groups of formula —$SO_3M$;
    (ii) sulfolane;
    (iii) a glycol compound selected from the group consisting of: ethylene glycol, diethylene glycol, triethylene glycol, tetraethylene glycol and pentaethylene glycol; and
    (iv) water.

2. The inkjet ink of claim 1, wherein an amount of sulfolane is greater than an amount of the glycol compound.

3. The inkjet ink of claim 1, wherein a ratio of sulfolane to the glycol compound is in the range of 10:1 to 2:1.

4. The inkjet ink of claim 1, wherein sulfolane is present in an amount ranging from 5 to 40 wt. %.

5. The inkjet ink of claim 1, wherein the glycol compound is present in an amount ranging from 1 to 20 wt. %.

6. The inkjet ink of claim 1, wherein the glycol compound is a higher order glycol selected from the group consisting of: triethylene glycol, tetraethylene glycol and pentaethylene glycol.

7. The inkjet ink of claim 1, further comprising glycerol.

8. The inkjet ink of claim 1, further comprising a non-ionic surfactant.

9. The inkjet ink of claim 1, wherein M is sodium.

10. The inkjet ink of claim 1, wherein A is a phenyl or naphthyl group having 1, 2 or 3 substituents selected from the group consisting of: —$SO_3M$, nitro, carboxyl, halogen, hydroxyl, amino, $C_{1-4}$ alkoxy and $C_{1-4}$ alkyl; and B is a phenyl or naphthyl group having 1, 2 or 3 substituents selected from the group consisting of: —$SO_3M$, nitro, carboxyl, halogen, hydroxyl, amino, $C_{1-4}$ alkoxy and $C_{1-4}$ alkyl.

11. A method of improving a lifetime of an inkjet printhead, the method comprising the steps of:

supplying an ink according to claim 1 to nozzle chambers of the printhead, each nozzle chamber having an associated actuator in contact with the ink; and actuating one or more of the actuators to eject ink from the printhead.

12. The method of claim 11, wherein each actuator comprises a resistive heater element.

13. The method of claim 12, wherein the heater element is uncoated.

14. The method of claim 13, wherein the heater element is comprised of a material selected from the group consisting of:

a titanium alloy;

titanium nitride; and a nitride of a titanium alloy.

15. The method of claim 14, wherein the printhead has a lifetime of at least 100 million ejections.

\* \* \* \* \*